May 18, 1954
D. C. BORTNER
2,678,664
CONDUIT CONNECTOR
Filed June 19, 1951
3 Sheets-Sheet 1
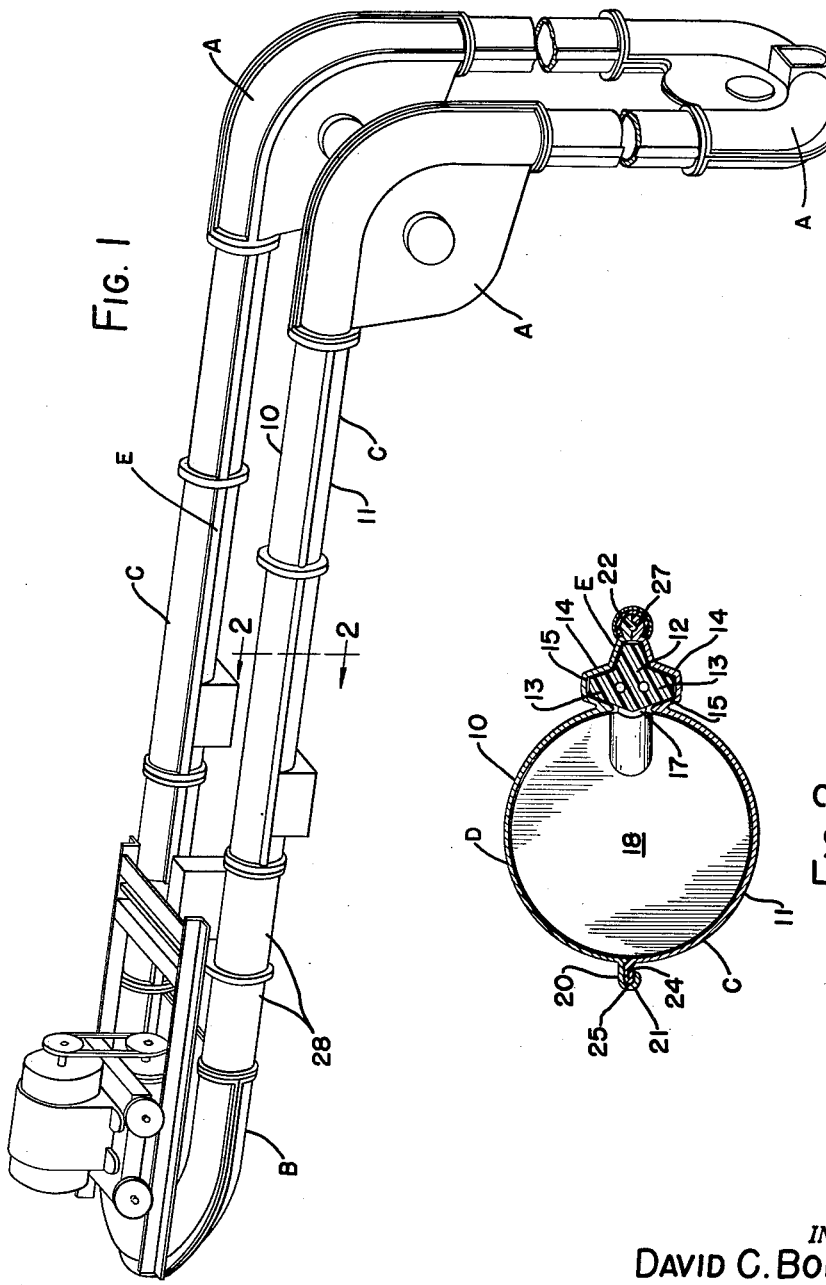
INVENTOR.
DAVID C. BORTNER
BY
Otto Moeller
Attorney May 18, 1954  D. C. BORTNER  2,678,664
CONDUIT CONNECTOR Filed June 19, 1951  3 Sheets-Sheet 2

INVENTOR.
DAVID C. BORTNER
BY
Otto Moeller
Attorney

May 18, 1954  D. C. BORTNER  2,678,664
CONDUIT CONNECTOR
Filed June 19, 1951  3 Sheets-Sheet 3

INVENTOR.
DAVID C. BORTNER
BY
Otto Moeller
Attorney

Patented May 18, 1954

2,678,664

UNITED STATES PATENT OFFICE 2,678,664

CONDUIT CONNECTOR

David C. Bortner, York, Pa., assignor to Read Standard Corporation, New York, N. Y., a corporation of Delaware Application June 19, 1951, Serial No. 232,393

4 Claims. (Cl. 138—25)

This invention relates to an improvement in clamps, particularly adaptable to sectional troughs or conduits employed with polyplane conveyors for connecting the abutting ends of the troughs or conduits together, and where the troughs or conduits are joined with turn casings.

The invention consists of certain novel features of construction and combinations of parts which will be hereinafter set forth and designated in the claims.

In the accompanying drawings:

Figure 1 is a perspective view illustrating one arrangement of a polyplane conveyor;

Figure 2 is a cross sectional view of a conduit, taken on line 2—2 of Figure 1;

Figure 3:
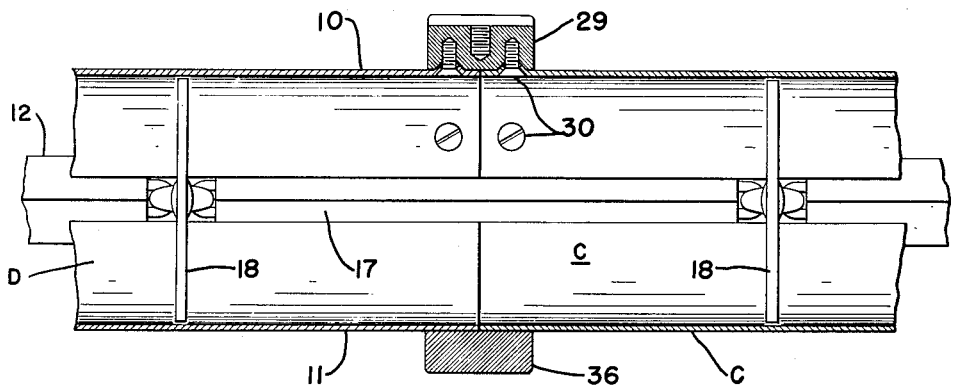
Figure 3 is a detail longitudinal sectional view showing the abutting ends of two conduits connected together by a clamp.
Figures 5, 6:
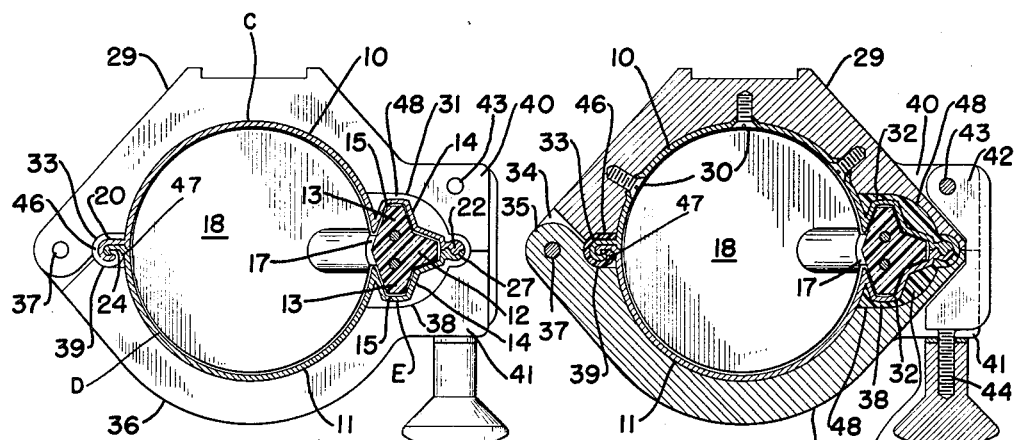
Figure 5 is a view in end elevation of a clamp applied to a conduit shown in cross section.
Figure 6 is a cross-sectional view through conduit and clamp.
Figure 4:
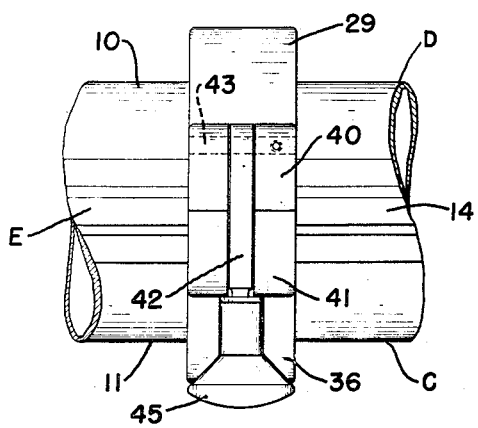
Figure 4 is a detailed view in elevation showing a clamp encircling the ends of two conduits.

In the drawings an illustration is shown of one arrangement of the conduits in providing a polyplane conveyor for conveying the material in a circuit having many directions and extending through a combination of horizontal, vertical and angular planes.

The conveyor is composed of a plurality of tubes or conduits C, in this instance arranged in parallelism, wherein the conduits are in sections, and each conduit consists of two longitudinal trough sections 10 and 11. Two trough sections when assembled together producing a tube D through which the material is conveyed. Each trough section 10 and 11 is provided with a longitudinal lateral extension 14, which extensions 14 of two superimposed trough sections, when brought together form a second tube E for an endless belt 12. The belt 12 is formed with four lateral projecting ribs 13, preferably equally spaced from one another. Three of the ribs 13 are received in channels 15, formed longitudinally of the extensions 14, 14, and tube E for rigidly supporting the belt in its travel. The inner adjoining edges of the trough sections 10 and 11, where the two tubes D and E are joined are spaced from each other to produce a passage or slot 17 lengthwise of the tubes, and this passage or slot 17 is normally closed by one of the ribs 13 of the belt 12, except where the connection is made between the belt 12 and paddles 18, see Figure 3. Paddles or flights 18, are suitably spaced from each other and are disposed in the tube D, and are connected to the belt 12 through the passage or slot 17.

The trough section 10 is provided with a longitudinal flange 20 which is bent inwardly to form a hook 21 along one edge thereof and the opposite edge of the trough is provided with an outwardly projecting bead 22 extending longitudinally of the extension 14. The other trough section 11 is provided along one of its edges and longitudinally thereof with a flange 24 which is provided with an inwardly directing hooked end 25. The flange 24 and hooked end 25 are similar in construction to the flange 20 and hooked end 21 of the trough 10, but is of a size to fit and be received within the hooked end of flange 20 and hooked end 21 of the section 10 so that the trough section 11 may swing away from the section 10 with the flange 20 and hooked end 21 acting as a fulcrum or pivotal point for the flange 24 and hooked end 25 of the trough 11. On the opposite side the trough 11 is provided at the outer edge of the extension 14 with a longitudinal groove 27 for the reception of the bead 22 when the sections 10 and 11 are brought together as illustrated in Figure 2.

The ends of the parallel conduits D and E are connected at one of their ends to a telescopic conduit 28, of similar construction, of a horizontal turn casing B and at their opposite ends are connected to a vertical turn casing A.

Referring more specifically to Figures 3 to 6 the abutting ends of the trough sections 10 and 11 are connected together by sectional clamps. The outer clamp section 29 encircles and conforms to the contour of the trough section 10 and is connected thereto by means of screws 30 which pass through the trough section 10. This clamp section 29 is also recessed as at 31 to envelope the extension 14 and bead 22. The clamp section 29 is also recessed at 33 for the reception of the flange 20 on the opposite side of the trough section 10. One end of the clamp section 29 is slotted or bifurcated at 34 for the reception of a tongue 35 of the inner clamp section 36. The tongue 35 is connected to the clamp section 29 by a pin 37 for forming a pivotal connection between the two sections 29 and 36. The inner clamp section 36 encircles and conforms to the contour of the trough section 11 and also is provided along its inner face with a recess 38 for the reception of the extension 14. This clamp 36 is also provided with a recess 39 for the reception of the flange 24 of trough section 11 and hooked end 21 of trough section 10. In this manner the two tubes D and E of the conduit C are entirely confined within the clamp sections 29 and 36. Formed on the exterior of each clamp section 29 and 36 are slotted ears 40—41, respectively. The ears 40 and 41 of the respective clamp sections 29 and 36 are in registry with one another and pivoted to the ear 40 is a bolt 42 by a pin 43. This bolt is adapted to be swung downwardly into the slotted ears 40 and 41 and is provided at its lower end with screw threads 44 for receiving a knob 45 which has screw threaded engagement with the bolt for locking the two clamping sections 29 and 36 about the tubes D and E.

Received in the recess 33 of clamp section 29 and recess 39 of clamp section 36 is a C-shaped gasket 46, one end of which is provided with a hooked end or flange 47 which is received within the hooked ends 21 and 25 of sections 10 and 11. Received in the recess 31 of clamp section 29 is a gasket 48 which is provided on its inner surface with a plurality of longitudinal recesses 32 for the reception of the extension 14 of the trough section 10 and to conform to the horizontal and vertical channels 15 of the extensions. The clamp section 36 receives a similar gasket 50 in the recess 38 to conform to the extension 14. In this manner when the knob 45 is screwed upon the bolt 42 the clamp sections and gaskets insure a tight joint between the abutting edges of a pair of adjacent tubes D and a pair of adjacent tubes E.

It will be appreciated that upon the release of the knob 45 and swinging the bolt 42 from engagement with the slotted ears 40 and 41 that the clamp bracket 36 and trough section 11 may be swung away from the clamp section 29 and trough section 10 for the purpose of cleaning the troughs or making necessary repairs.

Figure 7:
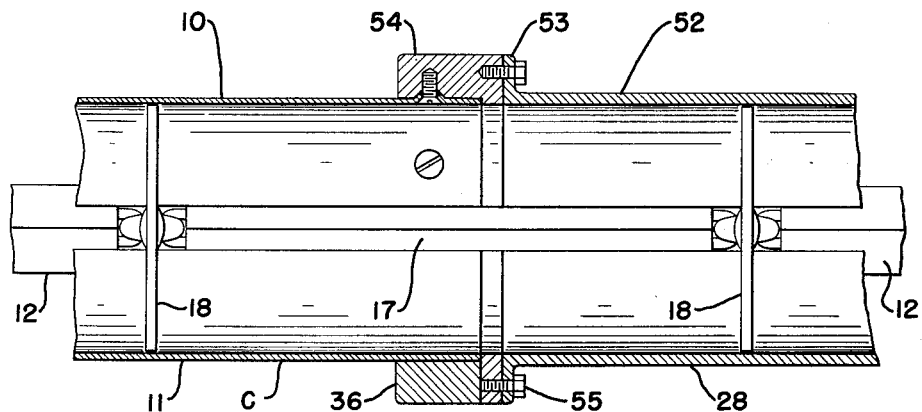
Figure 7 is a longitudinal sectional view of conduits connected together by a modified clamp.
Figure 8:
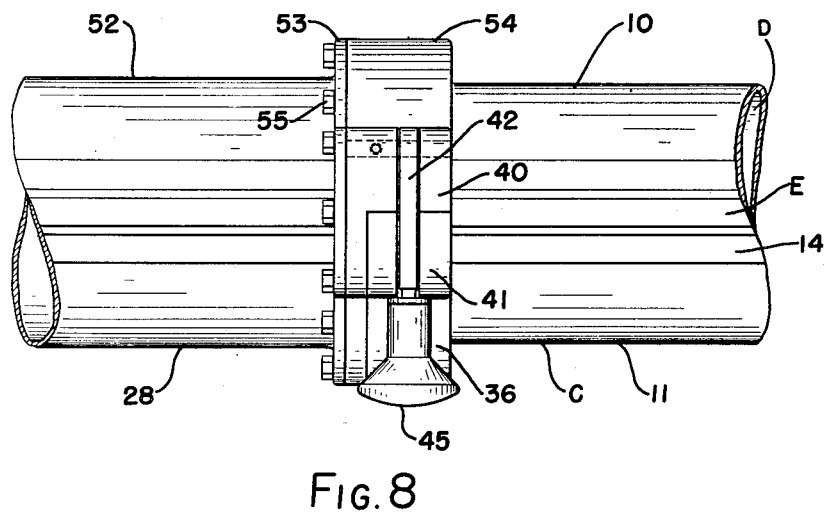
Figure 8 is a detail view in elevation of the construction shown in Figure 7.

Figures 7 and 8 disclose the clamp sections 54 and 36 for connecting the trough sections 10 and 11 to the flanged trough sections 52, which are elements of the telescopic sections 28 connected to the horizontal turn casing B. These sections 52 are provided with a flange 53 and the clamp section 54 is made annular to receive the screw bolts 55 for connecting the trough sections 52 to the clamping section 54. As seen in Figure 8 the clamp section 54 is provided with a clamp section 36 which is pivoted thereto similar to that shown in Figures 5 and 6 and which section 36 is secured to the clamp section 54 similar to that shown in Figures 5 and 6 by means of the bolt 42, knob 45, and slotted ears 40 and 41. The clamping arrangement as shown in Figures 7 and 8 is also provided for connecting the ends of trough sections 10 and 11 with the flanged ends of vertical turn casing A, and therefore need not be further described.

I claim:

1. The combination of two longitudinally sectional conduits arranged in abutting relation, said sections of each conduit being hinged together, each of said sections of each conduit being provided with a longitudinal semi-circular passage and a longitudinal channel, a C-shaped gasket engaging said conduit sections about said hinged connection thereof, gaskets having a channel interfitted with said channels of said sections, a clamp encircling said conduits at their juncture of abutment and engaging said gaskets, said clamp having two sections hinged together and one of said clamp sections being connected to a section of each of said adjacent conduits, and means for connecting said clamp sections together.

2. The combination of a plurality of longitudinally sectional conduits arranged in end to end relation, each conduit comprising an upper and a lower section, a sectional clamp for connecting the ends of said adjoining conduit sections together, means for hinging said clamp sections together, one section of said clamp being connected to adjoining sections of said conduits for joining said conduit sections together, said other conduit sections being supported at their ends by said other clamp section, and means connecting said clamp sections and conduit sections together.

3. The combination of a plurality of longitudinally sectional conduits arranged in end to end relation, said sections of each conduit being hinged together, a clamp encircling the ends of each of said adjoining conduits, said clamp having an inner and an outer section hinged together, said outer clamp sections of each clamp being connected to adjoining sections of said conduits for connecting said sections together, said inner clamp sections and said other conduit sections encompassed thereby having a swinging movement with respect to said first mentioned outer clamp sections and said conduit sections, and means for connecting said inner and outer clamp sections together and causing said sections of a conduit to be joined.

4. The combination of a plurality of longitudinally sectional conduits arranged in end to end relation, said sections of each conduit being hinged together, each of said conduit sections having a longitudinal trough passage and a longitudinal channel shaped extension to provide two longitudinally parallel passages for each conduit, a clamp for connecting the ends of each of said adjoining conduits together, said clamp having an inner and outer section hinged together, said clamp sections having their inner surfaces conforming to the contour of said trough and channel extension of each of said conduit sections, said outer clamp sections being connected to adjoining sections of said conduits for connecting them together, said inner clamp sections and said other conduit sections having a swinging movement with respect to said first mentioned outer clamp sections and conduit sections, and means for connecting said inner and outer clamp sections together and causing said sections of a conduit to be joined.

References Cited in the file of this patent

UNITED STATES PATENTS

| Number | Name | Date |
| --- | --- | --- |
| 1,928,570 | Mustico | Sept. 26, 1933 |
| 2,383,932 | Brunner | Sept. 4, 1945 |